United States Patent [19]

McElroy

[11] 3,968,865

[45] July 13, 1976

[54] CABLE CLIMBER SAFETY LOCK

[75] Inventor: Robert C. McElroy, Lisbon, Ohio

[73] Assignee: Cable Climber Safety Devices, Incorporated, Lisbon, Ohio

[22] Filed: May 20, 1974

[21] Appl. No.: 471,646

[52] U.S. Cl. .......... 188/188; 182/192; 254/156

[51] Int. Cl.$^2$ .......... B60T 8/12

[58] Field of Search .......... 254/154, 156, 172, 173, 254/174, 135 R, 150 R, 151; 73/488 R; 242/156.2; 188/189, 188, 65.1, 65.3, 65.5; 182/133, 192, 148

[56] References Cited

UNITED STATES PATENTS

| | | | |
|---|---|---|---|
| 660,792 | 10/1900 | Gail | 254/156 |
| 1,164,980 | 12/1915 | Bergenroth | 254/156 |
| 2,662,734 | 12/1953 | Allenbaugh | 188/188 |
| 2,976,955 | 3/1961 | Huber | 182/192 |
| 3,240,510 | 3/1966 | Spouge | 188/188 |
| 3,301,533 | 1/1967 | Pfaff, Jr. et al. | 254/174 |
| 3,351,302 | 11/1967 | Lang | 242/156.2 |
| 3,570,816 | 3/1971 | Germond et al. | 254/173 R |
| 3,688,999 | 9/1972 | Plattner et al. | 242/156.2 |
| 3,739,875 | 6/1973 | Clark et al. | 182/192 |
| 3,830,346 | 8/1974 | Watts | 188/188 |

*Primary Examiner*—L. J. Paperner
*Assistant Examiner*—Kenneth Noland
*Attorney, Agent, or Firm*—Blair & Brown

[57] ABSTRACT

A cable climber safety lock is provided that includes a sensing device. The safety lock is installed above and attached to a cable climber, and the safety lock can also be attached to other types of hoists. The safety lock gradually locks onto the cable as the climber accelerates beyond a predetermined speed down the cable and the unit also senses any climber movement on the cable after power is shut off.

3 Claims, 11 Drawing Figures

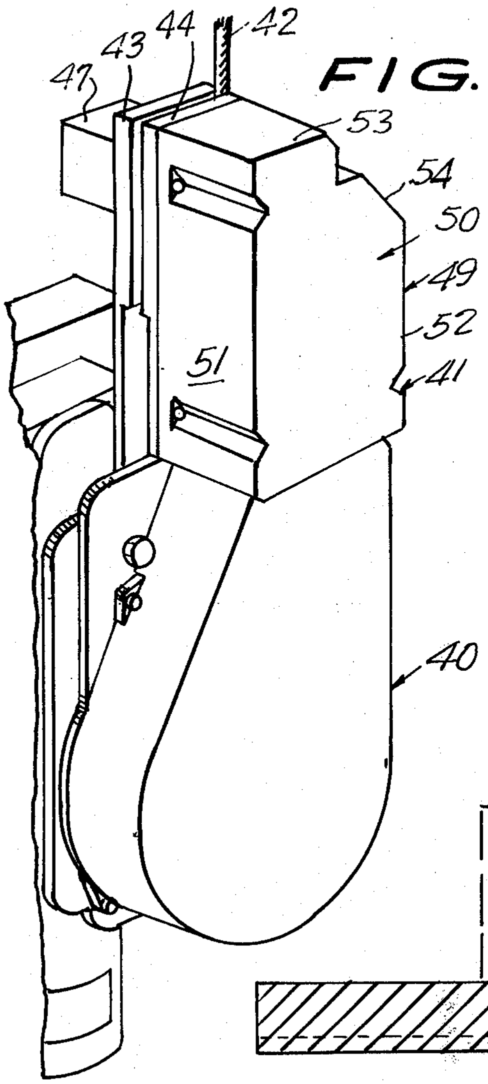
FIG. 1.
FIG. 3.
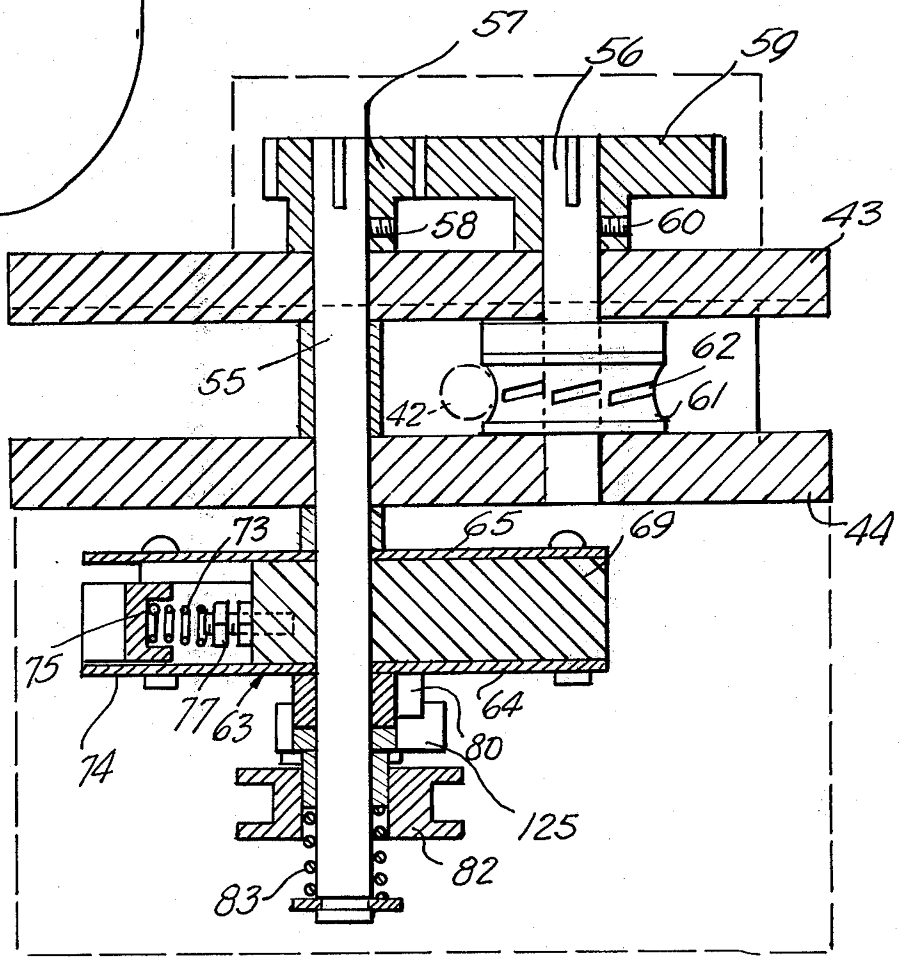

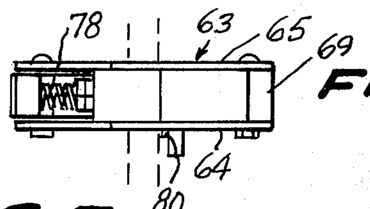
FIG. 6.
FIG. 7.
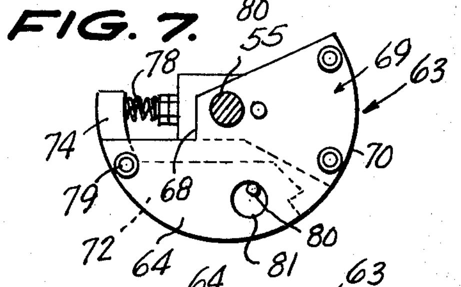
FIG. 8.
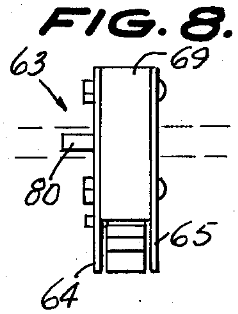
FIG. 10.
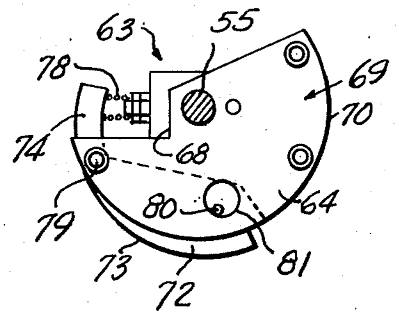
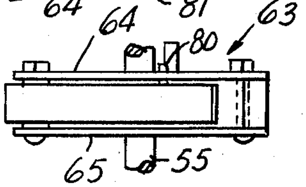
FIG. 9.
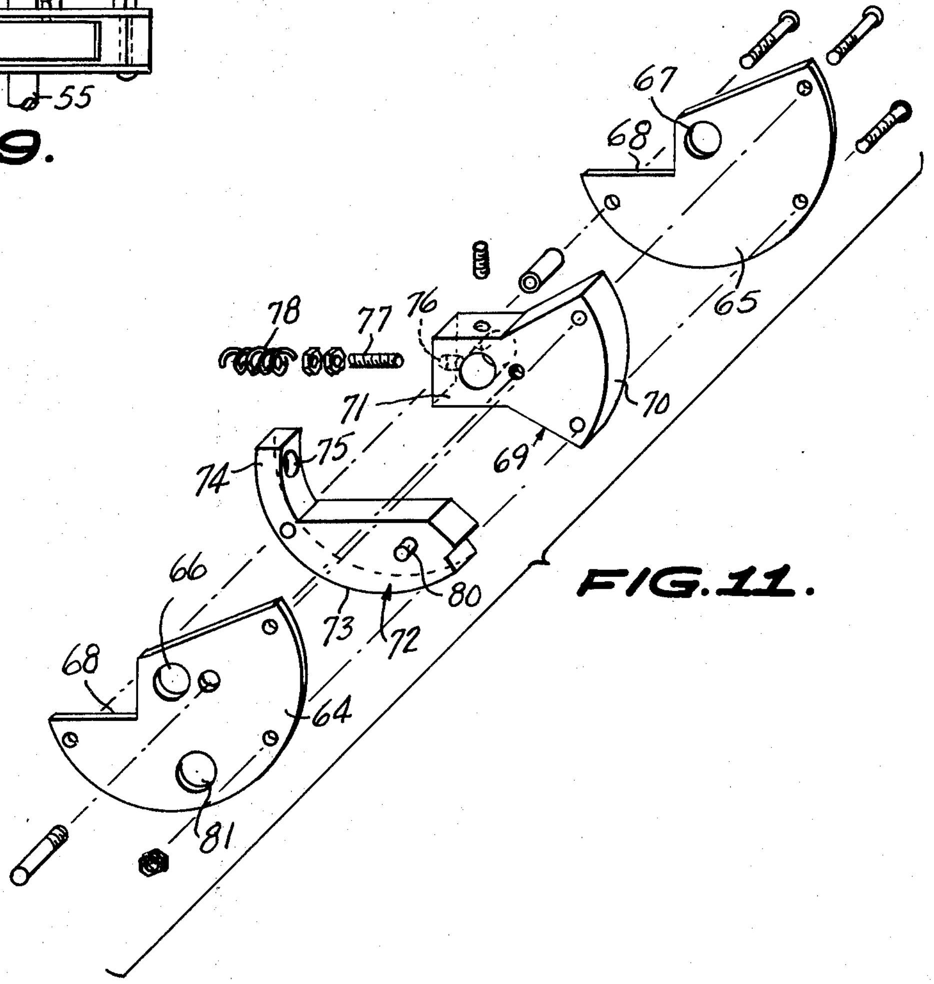
FIG. 11.

CABLE CLIMBER SAFETY LOCK

BACKGROUND OF THE INVENTION

FIELD OF THE INVENTION

The present invention relates to cable climbers or hoists, and more particularly to a safety lock for a cable climber.

SUMMARY OF THE INVENTION

A cable climber safety lock is provided that includes a sensing device that gradually locks onto the cable as the climber accelerates downwardly beyond a predetermined speed. The unit also senses any climber movement after power is shut off and wherein the device will lock up after approximately 6 inches of climber movement when used on electric powered units.

The primary object of the present invention is to provide a cable climber safety lock that senses excess speed of a climber on a cable and also unwanted displacement of electric models when the unit is traveling down the cable. Further, when a preset speed is exceeded the safety lock will lock onto the cable and stop the load effectively.

Still another object of the present invention is to provide a cable climber safety lock that is ruggedly constructed and efficient in use which is relatively simple and inexpensive to install and maintain.

Other objects and advantages will become apparent in the following specification when considered in the light of the attached drawings.

BRIEF DESCRIPTION OF THE DRAWINGS

FIG. 1 is a perspective view of the cable climber safety lock of the present invention;

FIG. 3 is a sectional view taken on the line 3—3 of FIG. 2;

FIG. 6 is a top plan view of the over speed sensor;

FIG. 7 is a side elevational view of the device of FIG. 6;

FIG. 8 is an end elevational view of the device of FIGS. 6 and 7;

FIG. 9 is a bottom plan view of the device of FIG. 6;

FIG. 10 is a view generally similar to FIG. 7 but showing the parts in a different position; and FIG. 11 is a perspective view showing the parts of the over speed sensor separated for clarity of illustration.

DESCRIPTION OF THE PREFERRED EMBODIMENT

Figure 2:
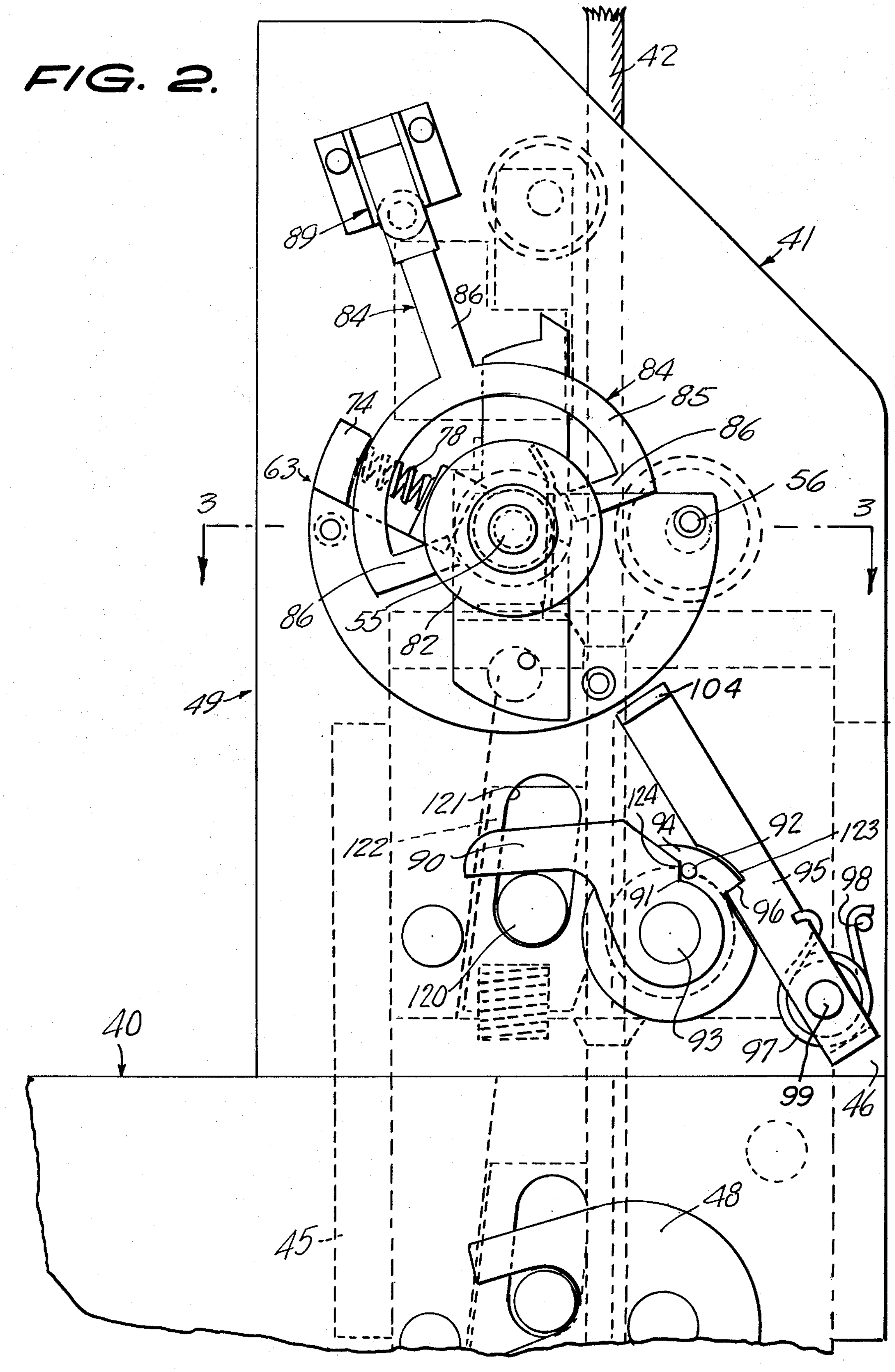
FIG. 2 is a front elevational view thereof.

Referring now to the drawings in detail, wherein like reference characters indicate like parts throughout the several figures, the reference numeral 40 indicates a cable climber having a construction somewhat similar to that shown in detail in prior U.S. Pat. No. 3,333,822 granted Aug. 1, 1967. As shown in the drawings there is provided a safety lock that is indicated generally by the numeral 41. The safety lock 41 is mounted on a cable 42 and has a portion thereof positioned between first and second spaced parallel plates 43 and 44. Mounting bars 45, 46 connect the assembly 41 to the cable climber 40. A displacement solenoid 47 is arranged contiguous to the upper portion of the first plate 43 and is secured thereto in any suitable manner. A pawl 48 has a construction and purpose generally similar to that described in connection with the pawl 47 in prior U.S. Pat. No. 3,333,822.

As shown in FIG. 1 there is provided a sensor 49 that includes a cover 50 comprising spaced apart vertically disposed side sections 51 and 52, as well as a horizontally disposed top section 53 and an inclined upper corner section 54.

Extending through the pair of plates 43 and 44 are first and second spaced parallel shafts 55 and 56, FIG. 3. First and second gears 57 and 59 are mounted on the projecting ends of the shafts 55 and 56 respectively and the teeth of the gears 57 and 59 are arranged in meshing engagement with respect to each other. The gears 57 and 59 are suitably secured to their respective shafts by means of securing elements 58 and 60. A sensor drive pulley 61 is arranged on the second shaft 56, and the pulley 61 is interposed between the pair of plates 43 and 44 with the pulley 61 having a plurality of serrated notches 62 therein.

A sensor assembly 63 is mounted on the first shaft 55, FIGS. 6 through 11, and includes first and second side pieces 64 and 65 having registering openings 66 and 67 therein for the projection therethrough of a portion of the shaft 55. The side pieces 64 and 65 have cutouts 68 therein. A spacer 69 is interposed between the pair of side pieces 64 and 65, and the spacer 69 includes a curved end portion 70 as well as a generally rectangular opposite end portion 71. A sensor weight 72 includes a curved outer surface 73 as well as a projecting lip 74, and the lip 74 has a recess 75 therein. The recess 75 is aligned with a recess or opening 76 in the spacer 69, there being a pin 77 engaging the recess 76, and a coil spring 78 has one end seated in the recess 75 while the other end of the spring 78 engages the pin 77.

A pin 80 extends from the side of the weight 72 through an opening 81 in the side piece 64. A pivot mounting 79 supports the weight 72 in the sensor assembly 63. A pin 125 coacts with pin 80 when pully 82 is moved axially on shaft 55 by the solenoid 47 so that the necessary action will take place.

Mounted on an end of the shaft 55 is a shiftable pulley 82, FIG. 3, and a coil spring 83 is mounted on the shaft 55 adjacent the pulley 82 normally urging the pulley 82 toward the pin 80.

Figure 4:
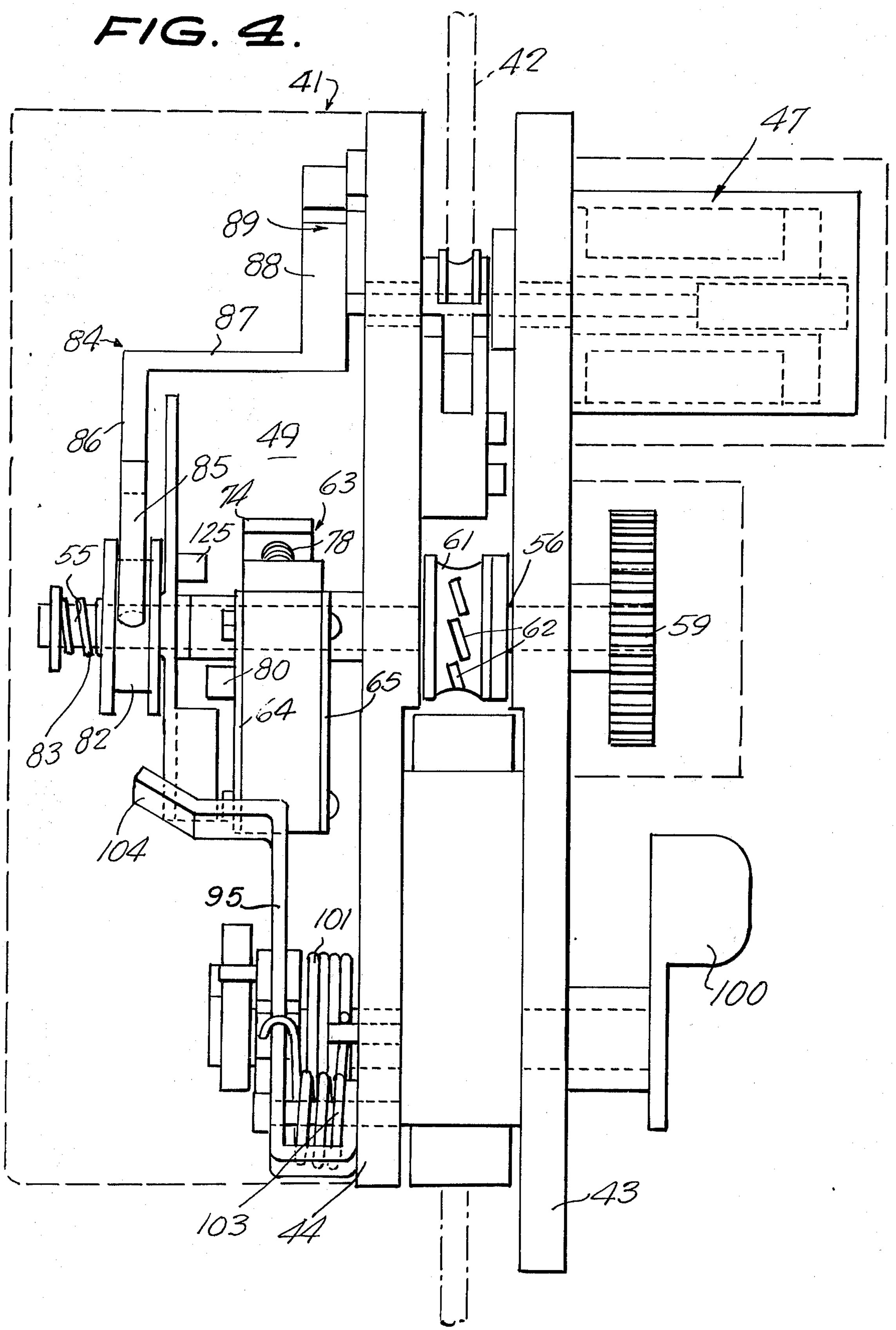
FIG. 4 is a right side elevational view of the device shown in FIG. 3.
Figure 5:
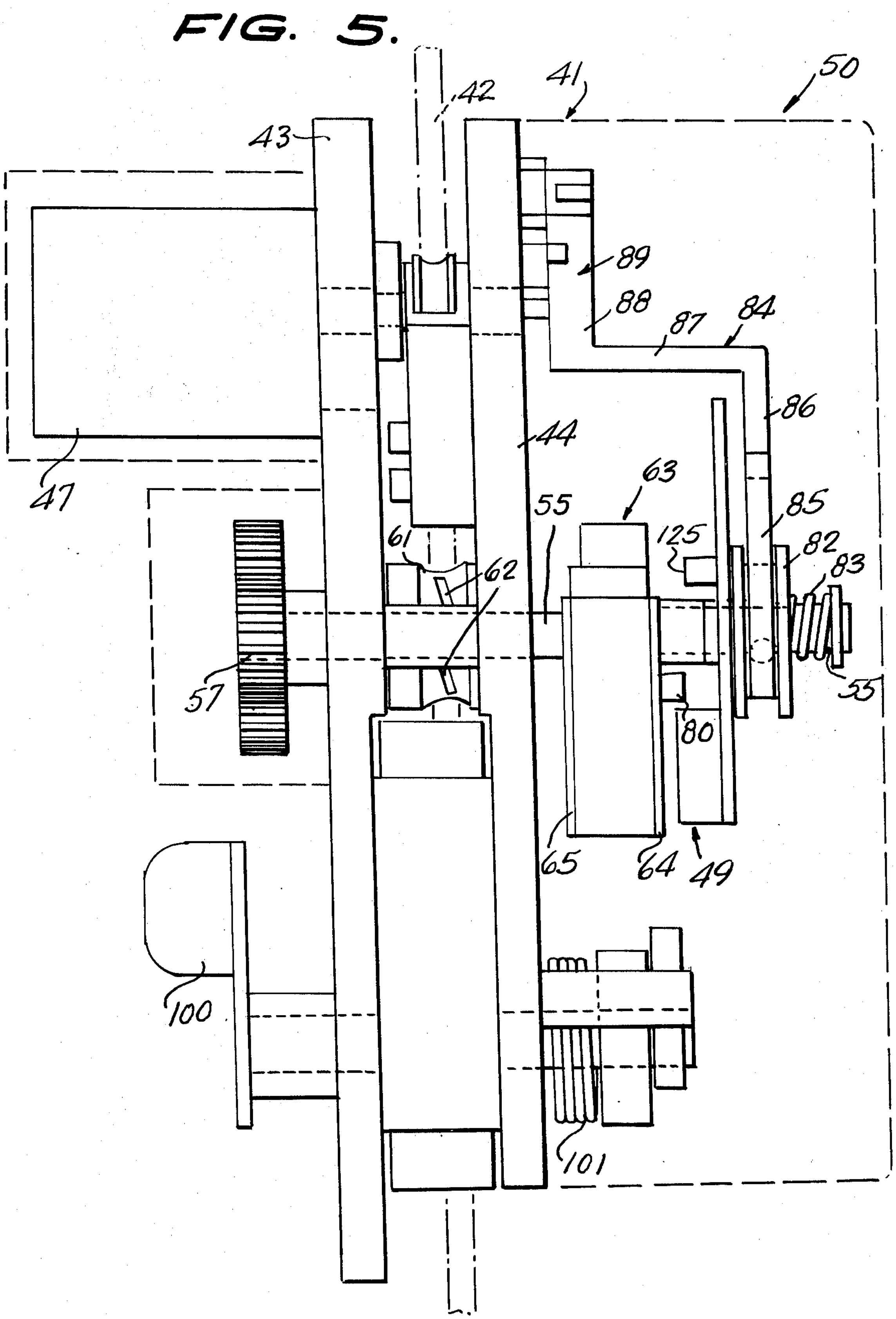
FIG. 5 is a left side elevational view of the device of FIG. 3.

A displacement activator arm 84 includes a curved portion 85 that is provided with diametrically opposed projections or lugs 86 that engage between the outer sides of the pulley 82. The arm 84 further includes a first section or portion 86 that is formed integral with portion 85, and as shown in FIG. 4 a second portion 87 is arranged at right angles to the and integral with portion 86. A third portion 88 is arranged at right angles to and integral with the portion 87, the portion 88 having a mounting means 89 adjacent the plate 44.

As shown in FIG. 2 a positive lock arm 90 is provided with a notched shoulder 91 for coaction with a pin 92 on a member 94, and the arm 90 is mounted on a shaft 93 journalled in the side plates 43 and 44. A cam trigger 95 is mounted on a shaft 99 supported on the side plate 44, and the cam trigger arm 95 has a notch 96 therein. A coil spring 97 has one end abutting the cam trigger arm 95, while the other end of the spring 97 engages a stop piece 98 on the plate 44.

A cam locking handle 100 is fixedly mounted on the shaft 93, FIG. 4, and has a cam tension spring 101 operatively connected thereto. The cam trigger arm 95 has an U-shaped end portion 103, and the arm 95 also includes an opposite end portion 104. Pin 120, FIG. 2, is movable nearly vertically in slot 121 and is connected to wedge lock 122. The pin 120 is engageable with positive lock arm 90. The member 94 has a projection 123 for selective engagement with notch 96. A pin 92 on the member 94 is engageable with shoulder 124. The notch 96 in trigger arm 95 selectively engages with the notch 96 so that upon rotation of the shaft 93, the desired locking and unlocking action can take place. Cam locking handle 100 can move to a tripped position upon disengagement of the notch 96 from the projection 123 whereby the wedge lock 122 is permitted to move upwardly and the cable is wedged in locking jaws. The handle 100 can be in a set position so that the cable will feed easily from the top. With the safety lock in operating position disengaged from the cable, the cable will pass in either direction if speed is below trip mechanism setting.

From the foregoing, it will be seen that there has been provided a cable climber safety lock 41 that includes the sensing device 49 that locks onto a cable 42 as it accelerates downwardly thereon beyond a predetermined speed. The device 49 also senses any climber movement after power is shut off and will lock up after approximately 6 inches of movement down the cable 42 when used on electric powered units.

The purpose of the safety lock of the present invention is to provide a device that senses excess speed of the climber 40 downwardly on a cable 42 as well as unwanted displacement of electric units when the unit is traveling down the cable 42. When the preset speed is exceeded, the safety lock 41 will lock onto the cable 42 and stop the load.

The safety lock 41 of the present invention can be easily installed above and attached to the cable climber 40 with arms or bars 45 and 46 bolted to the unit. The safety lock 41 can also be attached to other types of hoists, platforms or other equipment that may require the use of a safety device.

When installing the device, before passing the cable 42 through the safety 41, the reset handle 100 is positioned in the top position. After the cable 42 has been passed through the safety lock 41, the safety lock 41 will lock on the cable 42 in less than 4 inches of travel. The safety lock 41 of the present invention is a precision device.

In operation, if the safety lock 41 engages while lowering a load, the power is cut off initially and after examination, the unit can be reset. It is to be understood that the present invention can be used with various types of loads such as platforms being used to support personnel and the like.

The device is provided with a desired range of settings so that for example the safety locks 41 can be supplied with settings to engage and lock onto cable at climber speeds of 20, 33, 48 or 110 feet per minute and other speeds can be provided for.

The cable 42 is installed from the top of the device. With the reset handle 100 in "up" position, the cable 42 will feed through easily from the top. The bars 45 and 46 provide lower attachment fittings. The reset handle 100 is moveable to a tripped position so that the cable 42 will be wedged in locking jaws. With the safety lock 41 in operating position it will move in either direction on the cable 42 if the speed is below the trip mechanism setting. The safety lock 41 is rated for safe working load with a weight such as 1,000 pounds with a 10 to 1 safety factor.

It is to be understood that the parts can be made of any suitable material and in different shapes or sizes as desired or required.

Gradual locking is incurred by the shoe 122 sliding up a wedge gradually compressing the wire rope 42 until the climber movement on the wire rope is halted. This is accomplished by the action of the cam member 94 compressing the wire rope against the shoe 122 when the trigger arm 95 is tripped either by the overspeed sensor or displacement sensor. The friction of the wire rope as it is compressed against the shoe by the cam causes the shoe to move upward against the wedge and compress the wire rope.

The sensor pulley 61 is rotated by friction of the wire rope. The pulley in turn rotates the overspeed sensor through two gears 57 and 59. When the electric power to the solenoid is disconnected by the micro-switch, the displacement arm slides back on the shaft 55 toward the overspeed sensor and is also rotated then by the pin 80 on the overspeed sensor. As it rotates, the displacement arm trips the trigger arm 95 allowing the cam to be rotated against the wire rope by the torsion spring. The compression of the cam against the wire rope causes friction against the shoe which slides the shoe upward on the wedge which in turn compresses the wire rope stopping the movement.

When a preset speed is attained down the wire rope, the sensor pulley 61 is rotated by friction against the wire rope. This rotation turns the overspeed sensor and causes the sensor weight 72 by centrifugal force to compress a spring and allow the sensor weight 72 to move outward ¼ of an inch and trip the trigger arm 95 as the weight rotates. After the trigger arm is tripped the sequence in the preceding paragraph is followed.

Having thus described the preferred embodiment of the invention it should be understood that numerous structural modifications and adaptations may be resorted to without departing from the spirit of the invention.

I claim:

1. In combination with a cable climber, a safety lock including first and second spaced parallel vertically disposed plates, a vertically disposed support cable having a portion thereof positioned between said plates, a displacement solenoid contiguous to said first plate and secured thereto for selectively actuating said cable climber, mounting bars connecting said plates to said cable climber, a sensor for sensing relative movement between said climber and cable, first and second shafts arranged in spaced parallel relation with respect to each other and mounted in said plates, intermeshing gears on said shafts, a sensor drive pulley on said second shaft and said sensor drive pulley being interposed between said plates and having a plurality of serrated notches thereon, said sensor mounted on said first shaft, a shiftable pulley on the end of said first shaft, resilient means for engaging said shiftable pulley, said solenoid selectively shifting said shiftable pulley, means on said shiftable pulley selectively engaging means on said sensor to drive said sensor from said first shaft on operation of said solenoid, and a positive lock arm contiguous to said overspeed sensor.

2. The structure as defined in claim 1 wherein said sensor includes first and second side pieces having a spacer, said spacer maintaining said side pieces in their spaced apart location, a weight pivotally connected to said sensor assembly, and spring means operatively connected to said weight and spacer for biasing said weight and spacer to a position for actuating said cable lock.

3. The structure as defined in claim 2 further including a cam trigger arm on one shaft, and a cam reset arm means on said one shaft for selectively resetting said arm.

* * * * *